(12) United States Patent
Wang et al.

(10) Patent No.: US 12,730,907 B2
(45) Date of Patent: Sep. 8, 2026

(54) MECHANISMS FOR DESTROYING STORAGE DEVICES

(71) Applicant: Hanzhou Hualan Microelectronique Co., Ltd., Hangzhou (CN)

(72) Inventors: Wenkui Wang, Hangzhou (CN); Hang Tao, Hangzhou (CN); Jianjun Luo, Hangzhou (CN)

(73) Assignee: Hangzhou Hualan Microelectronique Co., Ltd., Zhejiang (CN)

( * ) Notice: Subject to any disclaimer, the term of this patent is extended or adjusted under 35 U.S.C. 154(b) by 71 days.

(21) Appl. No.: 18/947,491

(22) Filed: Nov. 14, 2024

(65) Prior Publication Data

US 2025/0190589 A1 Jun. 12, 2025

(30) Foreign Application Priority Data

Dec. 7, 2023 (CN) ......................... 202311674304.1

(51) Int. Cl.
*G06F 21/60* (2013.01)

(52) U.S. Cl.
CPC .................................... *G06F 21/60* (2013.01)

(58) Field of Classification Search
CPC ...................................................... G06F 21/60
See application file for complete search history.

(56) References Cited

U.S. PATENT DOCUMENTS

| | | | | |
|---|---|---|---|---|
| 9,600,684 | B2 * | 3/2017 | Cherel | G06F 21/6227 |
| 9,755,649 | B1 * | 9/2017 | Singhal | H03K 19/17768 |
| 10,248,553 | B2 * | 4/2019 | Gomes | G06F 11/3684 |
| 11,113,429 | B2 * | 9/2021 | Halladay | G06F 21/78 |
| 11,437,102 | B1 * | 9/2022 | Cohen | G06F 21/78 |
| 11,669,644 | B2 * | 6/2023 | Kim | G06F 13/4068 726/26 |
| 12,277,256 | B2 * | 4/2025 | Kwak | G06F 21/78 |
| 2016/0133331 | A1 * | 5/2016 | Hoeffgen | G11C 16/0416 365/185.32 |
| 2018/0336363 | A1 * | 11/2018 | Algie | G06F 21/554 |
| 2022/0100910 | A1 * | 3/2022 | Cao | G06F 3/0622 |
| 2022/0284958 | A1 * | 9/2022 | Cohen | G06F 21/78 |

* cited by examiner

*Primary Examiner* — Viral S Lakhia
(74) *Attorney, Agent, or Firm* — Joe Zheng

(57) ABSTRACT

Techniques to provide a storage device such as solid-state drive (SSD) with mechanisms for destroying the stored data therein. To achieve such data destruction, this application provides a destruction mechanism that generates heat high enough to break down some or all of the storing media in the device until the data stored in the device can no longer be usable.

18 Claims, 4 Drawing Sheets

MECHANISMS FOR DESTROYING STORAGE DEVICES

The present invention claims the priority of Chinese Patent Application No. 2023116743041 filed in China on Dec. 7, 2024, which is incorporated herein by reference.

BACKGROUND OF THE INVENTION

Field of Invention

The invention generally is related to the area of data destruction, and in particular, to method and apparatus for destroying data in a storage device (e.g., solid-state drive)

Related Art

In application scenarios with high confidentiality requirements, it may be necessary to destroy data in a storage device such as a solid-state drive in extreme situations. One common destruction method is physical destruction, that means physically damaging the storage medium (e.g., flash particles, also known as NAND particles) to achieve the purpose of data destruction. This may result in incomplete data destruction. Therefore, there is a need for improving the reliability of data destruction.

SUMMARY OF THE INVENTION

The purpose of this application is to provide a storage device such as solid-state drive with mechanisms for destroying the solid-state drive, thereby improving the reliability of data destruction. To achieve data destruction, this application provides a solid-state drive as example, which includes: storage particles or mediums for storing data, a main control device for outputting a trigger signal when a predetermined event that triggers destruction is detected, and a destruction control device for controlling a heating device to start when the trigger signal is detected, where the heating device is provided to heat the storage particles until the data stored in the storage particles can no longer be read.

Depending on implementation, the main control device includes one of a key switch, a timing control unit, a software control unit, or a remote control unit. Optionally, the heating device includes electric heating wires (e.g., thermocouple wires) covering the surface of the storage particles. The storage particles may include storing media, memory cells, circuits or electronic elements.

According to one aspect of this application, the destruction control device causes a high-voltage applied to the storage particles, causing the particles to break down. When the particles are made of circuits or electronic elements, internal connections between or among the particles are burned to disconnected or certain parts (transistors) are permanently damaged.

Optionally, the destruction control device is configured to increase a current beyond a predefined working limit in a very short period to cause certain parts in the storage particles to break down, where the current is normally used to keep the storage particles operate.

According to another aspect of this application the destruction control device includes a destruction control circuit. One end of the destruction control circuit is electrically connected or coupled to a power module, and the other end is coupled to a mechanism or heating device. The destruction control circuit is used to turn on the heating device when a signal (e.g., high-level) is detected, thereby supplying power from the power module to activate the heating device.

One of advantages, benefits and advantages of the present invention is to provide a mechanism to destroy the storing medium in a solid-state drive so that the data stored thereon can no longer be readable. There are many advantages, benefits and objects together with the foregoing attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENTS

The detailed description of the invention is presented largely in terms of procedures, steps, logic blocks, processing, and other symbolic representations that directly or indirectly resemble the operations of data processing devices. These process descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1-5. However, those skilled in the art will readily appreciate that the detailed description given herein with respect to these figures is for explanatory purposes as the invention extends beyond these limited embodiments.

Figures 1, 2:
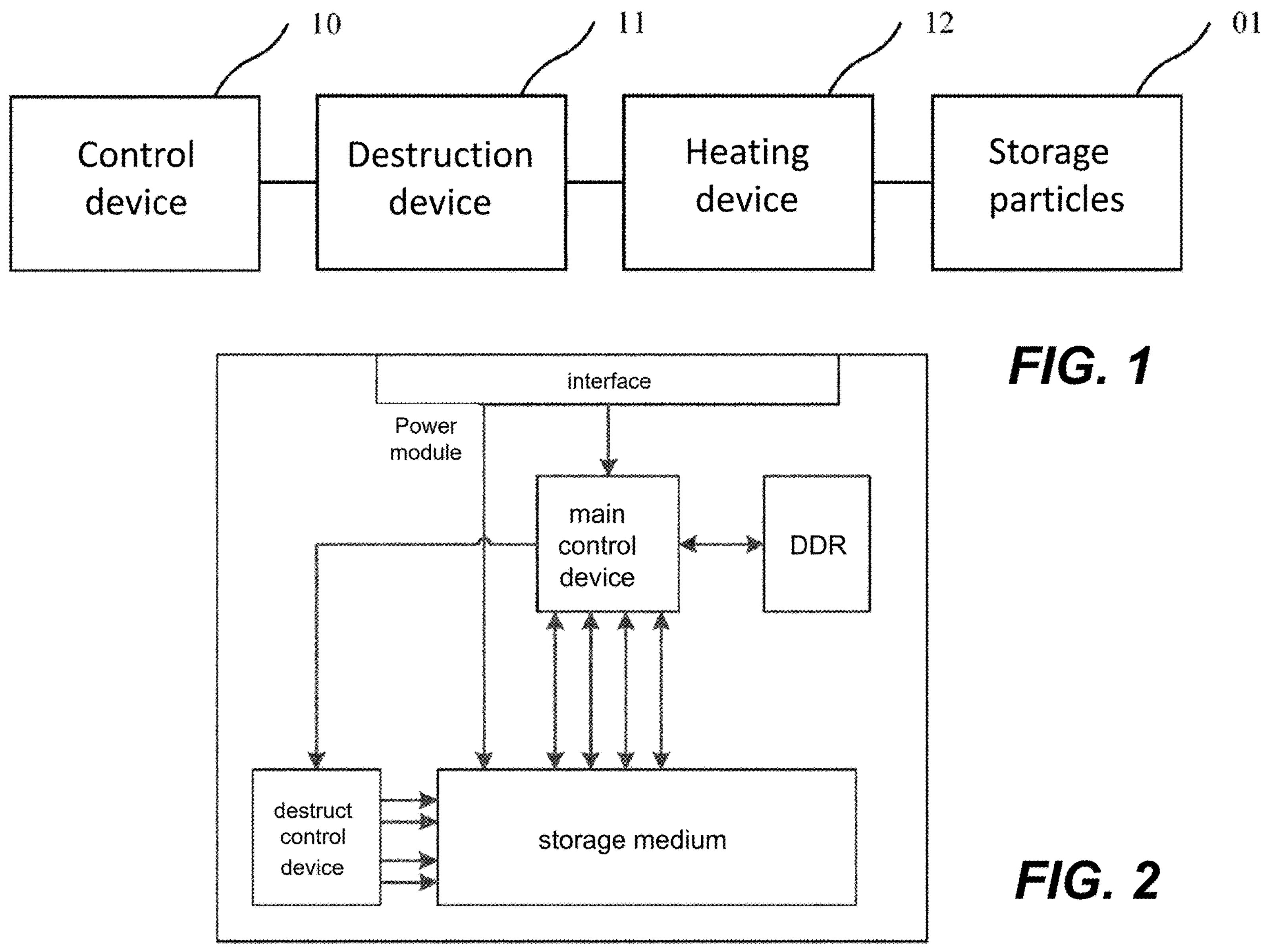
FIG. 1 shows an exemplary structural block diagram of a solid-state drive according to one embodiment of this application.
FIG. 2 shows an exemplary internal structure in a solid-state drive that uses various interfaces, at least a DDR (Double Data Rate) memory unit, a control unit, a destruction unit, and etc.

Referring now to the drawings, in which like numerals refer to like parts throughout the several views. FIG. 1 shows a structural block diagram of a solid-state drive provided in one embodiment of this application. The solid-state drive includes a storage medium or particles 01 for storing data, a control device 10 for generating a trigger signal when a predetermined event that triggers destruction is detected, a destruction control device 11, used for controlling the heating device to start when the trigger signal is detected, and a heating device 12 heating up the storage particles 01 until the data stored in the storage particles 01 can no longer be read. Those skilled in the art shall fully understand the exact structure or circuitry that may be designed to achieve one of the objectives contemplated in this application.

It should be noted than this exemplary embodiment does not limit the specific types of storage particles 01, as long as they can store data. For example, the storage particles 01 may include NAND memory cells, each includes one or more floating gate MOSFETs (Metal-Oxide-Semiconductor Field-Effect Transistors). The solid-state drive in this embodiment includes but may not be limited to the above-mentioned storage particles 01, a main control device 10, a destruction control device 11, and a heating device 12. Depending on implementation, as shown in FIG. 2, a solid-state drive may also include various interfaces, DDR (Double Data Rate) memory unit, and etc.

This embodiment does not limit the specific types of the main control device 10. For example, the main control device 10 may include one or more of a key switch, a timing control unit, a software control unit, or a remote control unit. This embodiment does not limit the specific structure of the key switch, timing control unit, software control unit, or remote control unit. As long as it can send a trigger signal to the destruction control device 11 when a predetermined event that triggers destruction is detected, it can trigger the operation of high-temperature data destruction. This embodiment does not limit the specific types of predetermined events, which can be set according to the specific type of the main control device 10. For example, when the main control device 10 includes a key switch, the predetermined event may be detecting that the key switch is pressed. When the main control device 10 includes a timing control unit, the predetermined event may be detecting that the use time of the solid-state drive has reached a preset time threshold. When the main control device 10 includes a software control unit or a remote control unit, the predetermined event may be receiving a command to execute the data destruction.

This embodiment does not limit a specific method for detecting a predetermined event which may be set according to a specific type of predetermined events. For example, when the predetermined event is detecting that the key switch is pressed, the detection method may check whether the key switch is in a closed state. When the predetermined event is detecting that the use time of the solid-state drive has reached a preset time threshold, the detection method may be configured to judge whether the use time of the solid-state drive has exceeded the preset time threshold. When the predetermined event is receiving a command to execute the destruction, the detection method may be designed to judge whether the command to execute destruction has been received.

The specific type of the heating device 12 shall not be limited, as long as it can heat up the storage particles 01, causing some or all of the storage particles 01 damaged by high temperature so that the data stored in the storage particles 01 can no longer be read correctly. For example, the heating device 12 may include one or more electric heating wires, the electric heating wires are disposed closely on surface of the storage particles 01 in one embodiment. In another embodiment, the electric heating wires are disposed near certain components of the storage particles 01. Still in another embodiment, the heating device 12 causes an excessive power (e.g., current or voltage) to apply onto one or more components of the storage particles 01.

It should be noted that when a destruction event is triggered, due to very small resistance in the electric heating wires, temperature can quickly heat up, achieving the purpose of damaging permanently the storage particles 01. In one embodiment, the electric heating wires are closely disposed to the surface of the storage particles 01, the heat from the electric heating wires can be effectively transmitted to the storage particles 01. In another embodiment, the heating wires are respectively fabricated next or substantially close to conductors or wires leading to, connected between/among some components in the storage particles 01 when the memory mediums are designed or manufactured. The wires will be broken or disconnected when they are heated up beyond a predetermined temperature (e.g., >80 degree Celsius).

Still in another embodiment, when a destruction event is triggered, the destruction control device 11 is so designed to cause a normal power supply (e.g., voltage or current) suddenly increased/decreased beyond a normal working range. When an abnormal current or voltage is applied on a working component (e.g., a transistor), the component breaks down. Depending on the component, a short circuit may be formed, causing heating that in return melts down other components, eventually permanently damaging the storage media. As a result, data originally stored in the storage particles or media can no longer be read out, or the data makes no sense even if they are managed to be read out. From a physical perspective, when the media or components therein are heated up, the stored data bits "0" or "1" will be flipped randomly. Any attempt to read out the flipped data is just a void effort.

Still in another embodiment, when storage particles, such as non-volatile memory, are fabricated, designed or manufactured, a type of circuit in accordance with the destruction control device is embedded. That means there is no need to have an external or post-market circuit added to equip a storage device with the destruction mechanism as described herein.

This embodiment shown in FIG. 1 does not limit a specific method by which the destruction control device 11 controls the heating device 12 to start, as long as it ensures that the destruction control device 11 can change the heating device 12 from a closed state to a working state when the trigger signal is detected. For example, the destruction control device 11 can be used to connect the heating device 12 and a power module, when the trigger signal is detected, so as to start the heating device 12. It should be noted that in this embodiment, before the trigger signal is detected, the heating device 12 is not connected to the power module. Without the power supply from the power module, the heating device 12 is in a closed state. When the trigger signal is detected, the destruction control device 11 connects the heating device 12 with the power module, and the power module supplies power to the heating device 12 so that the heating device 12 can work.

This embodiment does not limit the specific method by which the destruction control device 11 connects the heating device 12 and the power module as long as it ensures that the destruction control device 11 can change the state between the heating device 12 and the power module from disconnected to connected when the trigger signal is detected. For example, the destruction control device 11 may include a destruction control circuit; one end of the destruction control circuit is electrically connected to the power module, and the other end is electrically connected to the heating device 12. The destruction control circuit is used to turn on when a high-level signal is detected, thereby connecting the heating device 12 and the power module to activate the heating device 12. It should be noted that in this embodiment, the trigger signal is a high-level signal. Before the high-level signal is detected, the destruction control circuit coupling to the heating device 12 and the power module is not turned on or in off state, so the heating device 12 is not connected to the power module. When the high-level signal is detected, the destruction control circuit connecting the heating device 12 and the power module is turned on, so the heating device 12 is connected to the power module.

This embodiment does not limit a specific structure of the destruction control circuit 11, as long as it ensures that the destruction control circuit can turn on when a high-level signal is detected. For example, the destruction control circuit may include a transistor and a MOS transistor in accordance with FIG. 3. The base of the transistor is electrically connected to the main control device 10, the emitter is grounded, and the collector is electrically coupled to the gate of the MOS transistor. The source of the MOS transistor is electrically coupled to the power module, and the drain is electrically coupled to the heating device 12. Correspondingly, when the base detects the high-level signal, the transistor and the MOS transistor are turned on. Further, in order to facilitate the adjustment of the voltage at each node of the destruction control circuit, the destruction control circuit may also include several resistors. For example, the destruction control circuit may include a first resistor, a second resistor, a third resistor, a transistor, and a MOS transistor; the base of the transistor is electrically connected to one end of the first resistor, the other end of the first resistor is electrically connected to the main control device 10, the emitter is grounded, and the second resistor is connected in parallel with the first resistor and the emitter, and the collector is electrically connected to the gate of the MOS transistor; the third resistor is connected in parallel with the gate and the source of the MOS transistor; the source of the MOS transistor is electrically connected to the power module, and the drain is electrically connected to the heating device 12. The MOS transistor (MOSFET) is a metal-oxide-semiconductor field-effect transistor.

This embodiment does not limit the specific types of the power module, as long as it ensures that the heating device 12 can reach a temperature at a predetermined level (e.g., >70° C.) that can destroy or damage the storage particles 01 to the point that data stored thereon can no longer be read out. For example, the power module may include a power supply for the solid-state drive or an external specific high-voltage power supply. The power supply for the solid-state drive may be a 5V power supply or a 12V power supply. An external specific high-voltage power supply may be a 48V power supply or a 220V AC power supply. Further, when the power module includes an external specific high-voltage power supply, in order to enhance safety, the solid-state drive in this embodiment may also include a high-voltage protection unit, which is used to disconnect the connection between the heating device 12 and the external specific high-voltage power supply when a dangerous event is detected. This embodiment does not limit to a specific type of dangerous events, which may be defined according to actual situations.

With reference to the above embodiments, when destruction is triggered, the destruction control device inside the solid-state drive controls the heating device to start, thereby heating up the storage particles inside the solid-state drive, and achieving the destruction of the storage particles through high temperature. Compared to traditional high-voltage destruction methods, this high-temperature destruction method offers higher reliability, ensuring more thorough data destruction.

Refer now to FIG. 2, it shows an exemplary schematic diagram of a solid-state drive embedded with high-temperature destruction according to one embodiment of this application. The high-temperature destruction solid-state drive includes modules such as various interfaces, a main control module, double data rate synchronous dynamic random access memory, a destruction control circuit, heating wires (not shown and an array of storage particle or storing medium.

Figure 3:
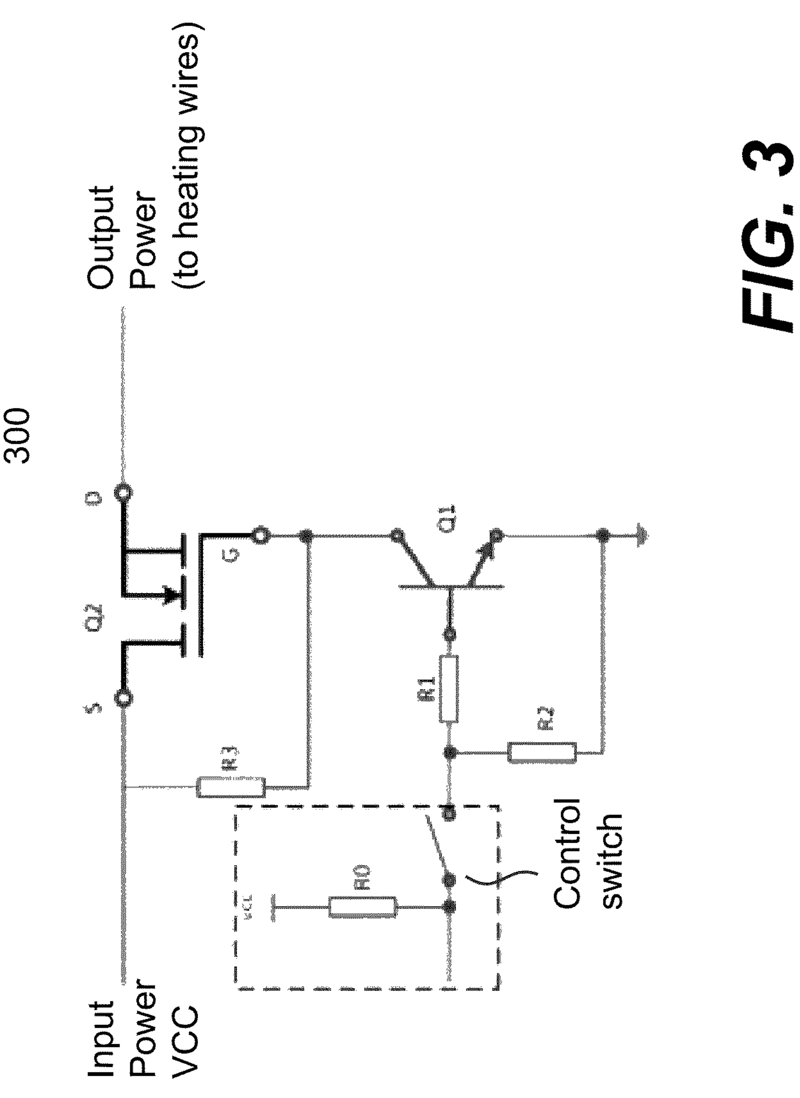
FIG. 3 shows an exemplary schematic diagram of a control circuit that may be used in a high-temperature destruction module for a solid-state drive according to the embodiment of this application.

FIG. 3 shows an exemplary schematic diagram of a control part of a high-temperature destruction solid-state drive provided according to one embodiment of this application. The main control module 300 includes a key switch, where the key switch includes a power supply voltage VCC, a resistor R0, and a control switch. One end of the control switch is electrically coupled to the resistor R0, and the other end is electrically coupled to the resistor R1. It should be noted that in addition to being designed as a key switch, the dashed box area in FIG. 3 may also be designed as a timing control unit, a software control unit, or a remote control unit, depending on implementation.

The destruction control circuit includes three resistors R1, R2, R3, a transistor Q1, and an MOS transistor Q2. In this particular embodiment, the base of transistor Q1 is electrically coupled to one end of resistor R1, the emitter is grounded, resistor R2 is coupled in parallel with resistor R1 and the emitter, the collector is electrically coupled to the gate of MOS transistor Q2, resistor R3 is coupled in parallel with the gate and source of MOS transistor Q2, the source (i.e., voltage input terminal) of MOS transistor Q2 is electrically coupled to the power module, and the drain (i.e., voltage output terminal) is electrically coupled to the heating wires.

Figure 4:
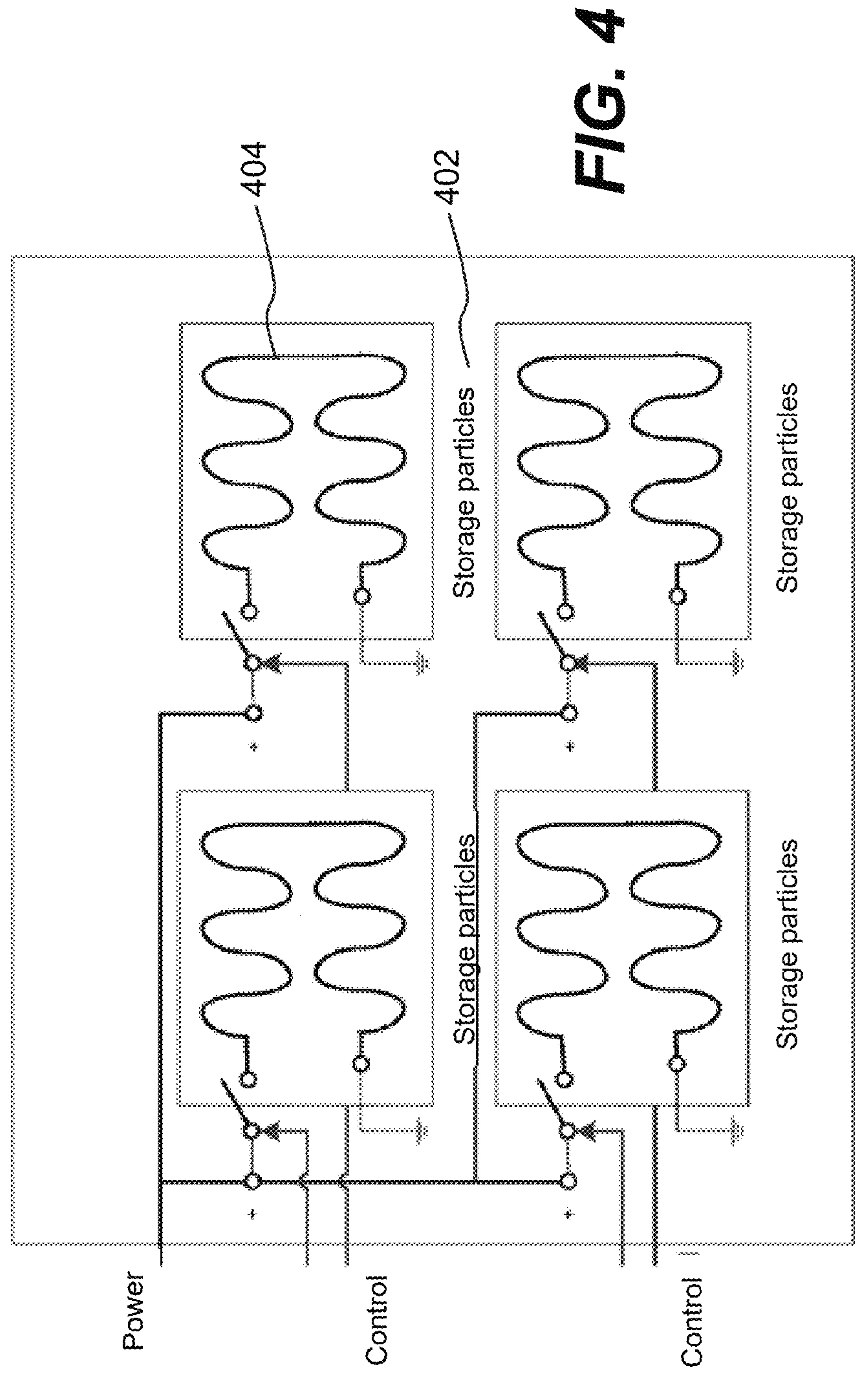
FIG. 4 shows an exemplary diagram of a destruction part in a solid-state drive according to one embodiment of this application.

FIG. 4 shows an exemplary diagram of a destruction part in a solid-state drive according to one embodiment of this application. The storage particle array 402 includes multiple storage particles, four are shown. The heating wires 404 are closely attached to the upper surface of the storage particles, ensuring that the heat from the heating wires 404 can be fully transmitted to the storage particles. When physical destruction is triggered, the power supply is connected, and due to the very small resistance and high power of the heating wires, they can quickly heat up, achieving the purpose of damaging the storage particles. The external power input can be a normal power supply for the solid-state drive, such as a 5V power supply or a 12V power supply; it can also be a specific high-voltage power supply for destruction, such as a 48V power supply or a 220V AC power supply. It should be noted that when using a high-voltage power supply, certain safety protection measures need to be taken, such as setting a high-voltage protection unit to disconnect the connection between the heating device and the external specific high-voltage power supply when a dangerous event is detected.

Figure 5:
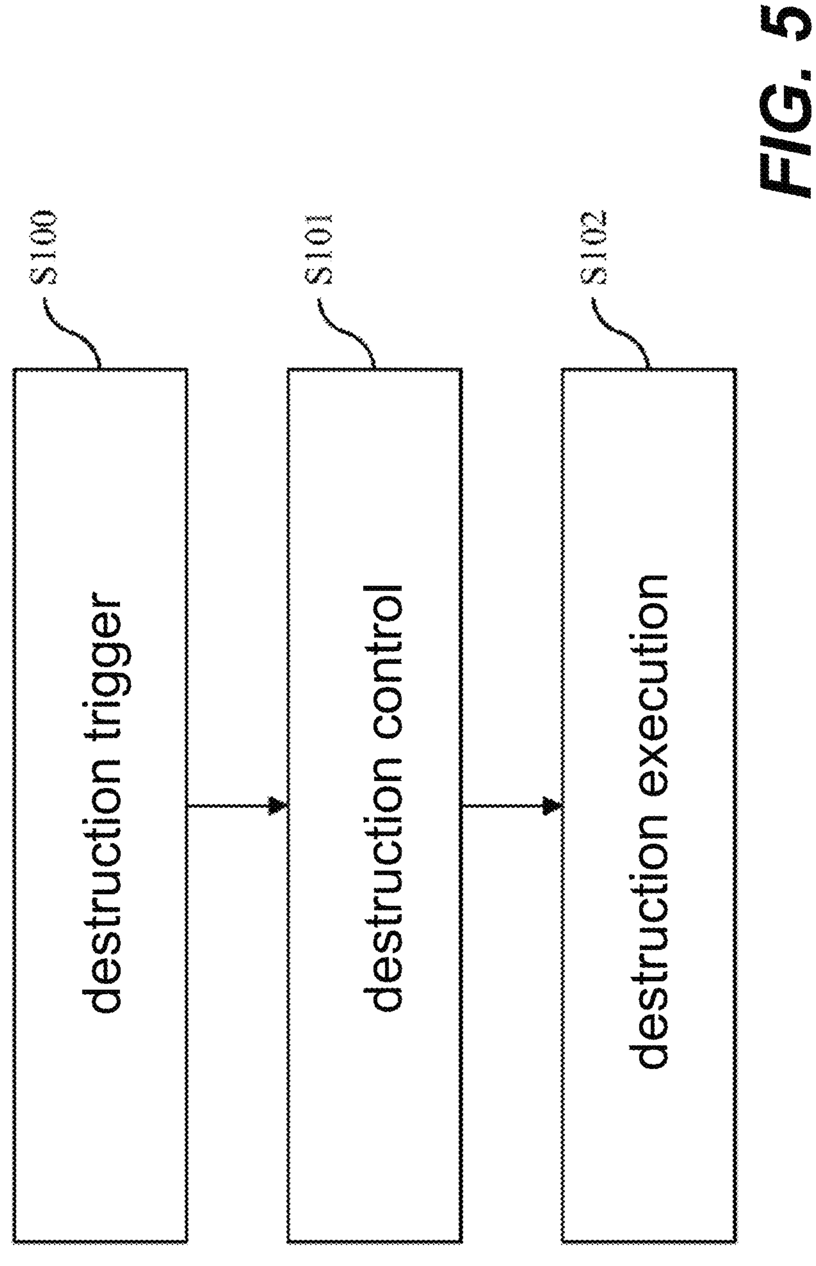
FIG. 5 is a flowchart of a high-temperature destruction process according to one embodiment of this application.

Refer to FIG. 5 shows a flowchart of a high-temperature destruction process according to one embodiment of this application. The destruction process includes essentially three steps: destruction trigger, destruction control, and destruction execution.

S100: External destruction is triggered. The triggering method may be an output of a trigger signal by a key switch, a timing control unit, a software control unit, or a remote control unit or the like. S101: After receiving the trigger signal, the destruction control circuit connects the power supply to the corresponding heating wires.

As shown in FIG. 3: (1) When the control switch remains open, transistor Q1 does not conduct, and at this time, the voltage Vgs between the gate and source of MOS transistor Q2 is 0V, so MOS transistor Q2 does not conduct, and the output voltage is 0; (2) When the control switch is closed, transistor Q1 conducts, and at this time, the voltage Vgs between the gate and source of MOS transistor Q2 is −5V, so MOS transistor Q2 conducts, the output voltage is the input voltage, namely the heating wires are coupled to a power supply, and the power supply now powers up the heating wires, the wires heating up.

S102: The heating wires work, generating high temperatures, and when the temperature rises above 500° C., the storage particles are quickly damaged, and the data stored in the storage particles can no longer be read.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. Accordingly, the scope of the present invention is defined by the appended claims rather than the forgoing description of embodiments.

What we claim:

1. A storage device with memory comprising: arrays of storage particles for storing data; a control device provided to output a trigger signal upon detecting a predetermined event to trigger destruction of the storage particles; a destruction mechanism to cause the storage particles permanently damaged; and a destruction control device, coupled to the destruction mechanism, provided to activate the destruction mechanism, upon detecting the trigger signal, wherein the destruction mechanism generates heating beyond a predetermined temperature, the heating breaks down one or more components in storage particles or flips randomly values of data bits stored in the storage particles so that data stored in the storage particles become unusable, the destruction control device including a destruction control circuit with a first end thereof coupled to a power module, and a second end thereof coupled to a heating device, the destruction control circuit configured to connect the heating device and the power module when the trigger signal is detected, thereby activating the heating device, wherein the destruction control circuit includes a transistor and a MOSFET (metal-oxide semiconductor field-effect transistor), a base of the transistor is coupled to the destruction control device, an emitter of the transistor is grounded, and a collector of the transistor is electrically coupled to a gate of the MOSFET, a source of the MOSFET is coupled to the power module, and a drain of the MOSFET is coupled to the heating device, and both the transistor and the MOSFET are turned on when the base of the transistor receives the trigger signal.

2. The storage device according to claim 1, wherein the destruction control device includes one of a key switch, a timing control unit, a software control unit, or a remote control unit.

3. The storage device according to claim 2, wherein the destruction mechanism includes the heating device including one or more heating wires disposed near surfaces of the storage particles.

4. The storage device according to claim 3, wherein, the destruction control circuit is caused to activate the heating device upon detecting the trigger signal.

5. The storage device according to claim 4, wherein the power module is external to the storage device and a power supply energizes the storage device.

6. The storage device according to claim 5, wherein the arrays of storage particles are part of a flash memory.

7. The storage device according to claim 3, wherein the destruction mechanism includes heating wires embedded near or coupled to a number of selected components in the storage particles, these components are broken down when the heating wires are powered and heat up.

8. The storage device according to claim 3, wherein the destruction mechanism includes heating wires embedded near or coupled to a number of connection wires between/among certain elements in the storage particles, the connection wires are melted down when the heating wires are powered and heat up.

9. The storage device according to claim 3, wherein the destruction mechanism includes one or more circuits coupled to a number of certain elements in the storage particles, the one or more circuits couple excessive power to the elements to cause permanent damage thereto.

10. The storage device according to claim 9, wherein the one or more circuits are part of the storage particles.

11. A method for destroying data on a storage device, the method comprising: generating a trigger signal, based on a predetermined event, to trigger destruction of storage particles in the storage device; and activating a destruction mechanism, upon detecting a trigger signal, wherein the destruction mechanism generates heating beyond a predetermined temperature, the heating breaks down one or more components in storage particles or flips randomly values of data bits stored in the storage particles so that data stored in the storage particles become unusable, the destruction control device including a destruction control circuit with a first end thereof coupled to a power module, and a second end thereof coupled to a heating device, the destruction control circuit configured to connect the heating device and the power module when the trigger signal is detected, thereby activating the heating device, wherein the destruction control circuit includes a transistor and a MOSFET (metal-oxide semiconductor field-effect transistor), a base of the transistor is coupled to the destruction control device, an emitter of the transistor is grounded, and a collector of the transistor is electrically coupled to a gate of the MOSFET, a source of the MOSFET is coupled to the power module, and a drain of the MOSFET is coupled to the heating device, and both the transistor and the MOSFET are turned on when the base of the transistor receives the trigger signal.

12. The storage device according to claim 3, wherein the destruction mechanism includes heating wires embedded near or coupled to a number of connection wires between/among certain elements in the storage particles, said activating a destruction mechanism further comprises: breaking down the connection wires when the heating wires are powered and heat up.

13. The method according to claim 11, wherein the destruction mechanism includes the heating device including one or more heating wires disposed near surfaces of the storage particles, the method further comprising: heating up the storage particles by the heating wires to a point that the data stored in the particles are randomly flipped, namely from "1" to "0" or "0" to "1".

14. The method according to claim 13, wherein the heating device is coupled to the power module, the destruction control is caused to activate the heating device upon detecting the trigger signal.

15. The method according to claim 14, wherein the power module is external to the storage device and a power supply energizes the storage device.

16. The method according to claim 15, wherein the arrays of storage particles are part of a flash memory.

17. The method according to claim 13, wherein the destruction mechanism includes heating wires embedded near or coupled to a number of selected components in the storage particles, these components are broken down when the heating wires are powered and heat up.

18. The method according to claim 11, wherein the destruction mechanism includes one or more circuits coupled to a number of certain elements in the storage particles, said activating a destruction mechanism further comprises: supplying excessive power to the elements via the one or more circuits to cause permanent damage thereto.

* * * * *